United States Patent Office 2,738,255
Patented Mar. 13, 1956

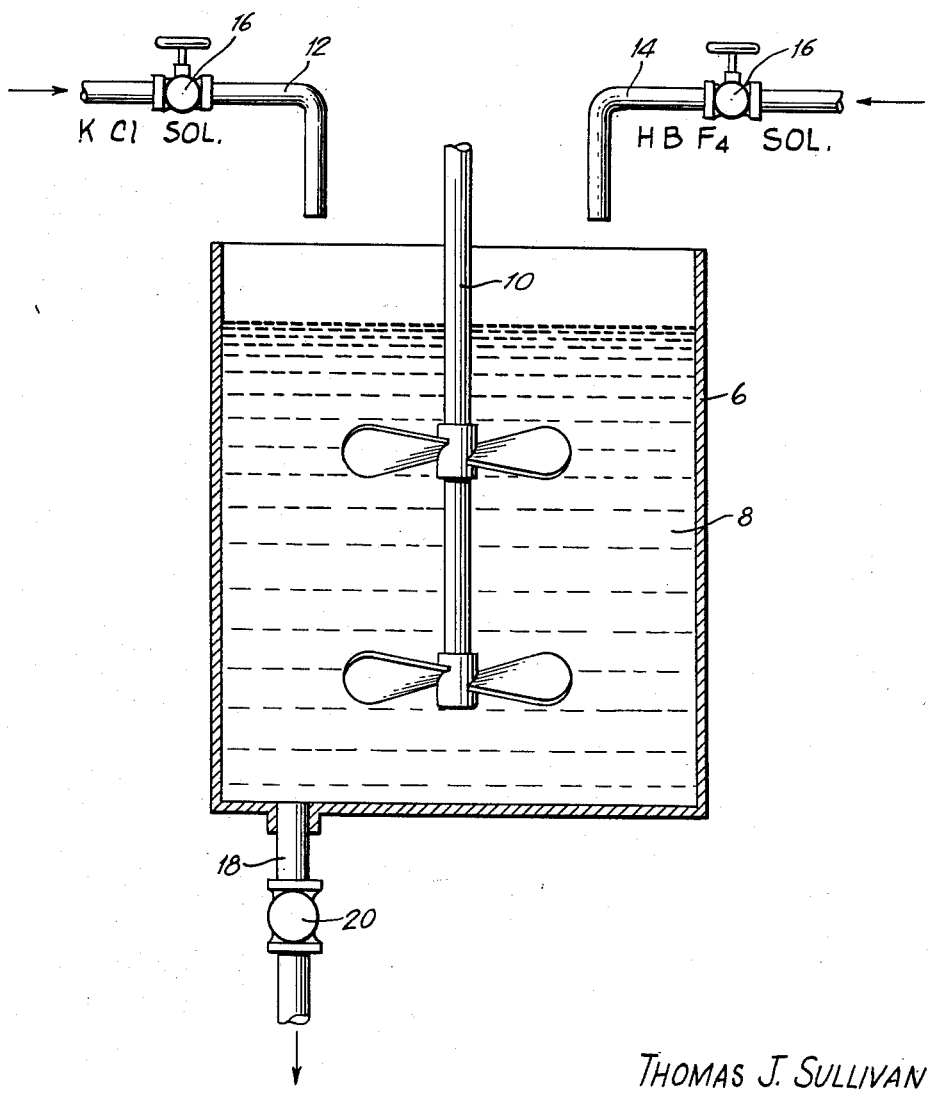

2,738,255
MANUFACTURE OF POTASSIUM FLUOBORATE

Thomas J. Sullivan, Princeton, Charles H. Milligan, Westfield, and George F. Lillquist, Iselin, N. J., assignors to The American Agricultural Chemical Company, New York, N. Y., a corporation of Delaware Application August 4, 1954, Serial No. 447,738

8 Claims. (Cl. 23—59)

This invention is concerned with a new product, namely crystalline potassium fluoborate of improved physical character, and is also especially directed to a new process for manufacturing this substance. The chemical compound, as such, is known, but heretofore a common way of making it has involved the production of a gelatinous mass which dried to a gritty powder, and the finished material has had a bad tendency to cake.

More specifically, the new product is potassium fluoborate ($KBF_4$) in a crystalline form which, when dry, appears like dry table salt and exhibits no tendency to cake or to cohere in a hard mass or masses in the manner of some types of finely powdered materials. Potassium fluoborate has various fields of commercial utility, among which (according to present understanding) are use as a catalyst in the oil industry, and use in the grinding wheel industry in making certain types of grinding wheels.

A particularly important object of the invention is to provide a new method for producing the named substance. When made according to the improved method, and especially according to preferred practice of such method, the product is new in its physical form in that the same compound is not believed to have been manufactured heretofore in the above described crystalline form. It therefore represents a novel product of crystalline potassium fluoborate, relatively free flowing and having improved utility, e. g. in the operations necessary for transportation, storage and use, and particularly in moving, feeding, weighing, measuring and otherwise handling the loose material.

The figure of the drawing shows a schematic representation of apparatus which may be used in carrying out the improved method.

The new process broadly involves reacting in solution a water soluble potassium salt with fluoboric acid preferably at controlled rates of addition and at an elevated temperature, while agitating the mixture and maintaining in the solution, from the outset, a quantity of special seed crystals of potassium fluoborate. This combination of steps or features has been found critically and unexpectedly effective in yielding production, essentially continuous, of a non-gelatinous precipitate of potassium fluoborate particles in crystalline form and approximately uniform size.

In the figure of the drawing, there is illustrated an agitation tank 6, which contains an aqueous liquid 8 (e. g. water, at the outset) having seed crystals therein (not shown). There is an agitator 10, which may take any convenient form and is illustrated schematically as pairs of paddle blades mounted in vertically spaced relation on a shaft driven from above. Input pipes 12 and 14 are provided for introducing the solutions to be mixed in the tank 6. Any convenient type of inlet tubes or other devices having means to control the rate of flow may be employed in place of the structures illustrated, it being understood that the drawing is purely schematic in nature. Thus a pair of valves 16, one located in each of the input pipes 12 and 14, are shown for regulating the rate of introduction of the two ingredients, i. e. as a simple example of means for metering the feed of the reactant solutions. For withdrawal of a suspension or slurry of product crystals from the lower part of the tank 6, suitable siphon or other means can be used; simply by way of example, the drawing shows a tap-off pipe 18 opening into the bottom of the tank 6 and including a valve 20 or other convenient means for regulating the quantity of the product which is to be tapped off.

As indicated, the process is predicated on the discovery that by mixing the potassium salt, e. g. potassium chloride, and the fluoboric acid at suitable rates into a body of solution which contains a quantity of formed crystals of the fluoborate and which is stirred to keep at least the smaller size crystals in suspension, the potassium fluoborate as produced by reaction is prevented from forming in a gelatinous or similar state, but on the contrary evolves in crystalline form, apparently in large part by growing upon the crystals present in suspension. Thus aqueous solutions of potassium chloride and fluoboric acid are respectively fed through the pipes 12, 14 into the liquid 8 (in the tank 6) while the latter is agitated and while it (or the supplied solutions or all of these liquids) is at least moderately heated, as by steam coils or other means (not shown) for the tank 6; the result is the production of the desired crystalline precipitate in substantial and continuing quantity, so that the larger size fraction of the crystal product can be drawn off with a portion of the liquid, continuously or at desired intervals, through the pipe 18.

Sufficient continuous agitation of the fluid 8 in the tank 6 is effected to maintain a large percentage of the precipitate being formed (including the initial seed and the new precipitate continuously present as seed) in a state of suspension. Preferably, the stirring means 10 is operated at a sufficient rate to keep substantially all of the precipitate in motion in the tank. In this connection, it will now be appreciated that the heavier crystals of potassium fluoborate being formed will tend to fall to the bottom of the tank 6 and be withdrawn through the tap-off pipe 18, to constitute the product, which can then be separated from the liquid and suitably washed and dried.

The process of mixing the solutions of potassium salt and fluoboric acid is very preferably carried out at an elevated temperature. Although some production of crystal precipitate may be accomplished by mixing the solutions sufficiently slowly at relatively low temperatures, it has been found that as a practical matter unless a temperature of at least about 65° C. is used during the mixing, the time element becomes prohibitive. That is to say, the rate of introducing the potassium salt and the fluoboric acid must then be so slow (to avoid a powdery precipitate) as to make the production rate relatively uneconomical. A preferred range of temperature for the mixing operation is approximately 75°–85° C.; 80° C. seems to be about the optimum. The mixing can be performed at higher temperateures, i. e. above 85° C., but without any special advantages as at present known; indeed it is ordinarily desirable to keep the temperature below 95°–100° C., not only to avoid boiling but also possibly to avoid loss of desired chemical values by volatilization.

For the desired results the presence of seed crystals is a critical requirement and it is therefore necessary to have some potassium fluoborate crystals in the original solution as the mixing of the potassium salt and the fluoboric acid begins to occur. Once the process has been started, the necessary seed crystals for continuing it may be obtained by leaving some crystals to act as seed, whether the process is carried out continuously or in batches. According to present understanding the deposition of potassium fluoborate by the reaction occurs at least in part on the seed crystals to enlarge them, and presumably in part in the precipitation (and growth) of further crystal particles. Hence the seed crystals are in general considerably smaller (in average size) than the finished product crystals which are those that tend to accumulate near the bottom of the reaction vessel and that are withdrawn through the pipe 18. Once there has been one operation of the process, the seed crystals needed for another or a resumed operation can be a part of the product (e. g. a finer fraction thereof) from the first. In order, however, to produce the first seed crystals necessary for commencing a first operation of the process, the procedure outlined below has been found satisfactory.

A reaction of fluoboric acid and potassium chloride is obtained by adding these two ingredients slowly together to a quantity of water. Following the complete mixing of stoichiometric quantities of these two ingredients, the liquid is decanted by any convenient means and the same procedure is repeated on top of the residue of solids which were formed. This mixing of reactants and decanting of the supernatant liquid is repeated three times (counting the first time) and then double the amount (by weight) of both ingredients is used for two additional mixing cycles or procedures the same as before. Then the same procedure is repeated three more times while using four times the amount of each ingredient. The total number of mixing and decanting procedures carried out is therefore eight complete cycles, the ultimate solid residue being the total reaction product (KBF$_4$) of all eight cycles.

A specific example of quantities involved in carrying out the production of seed crystals is as follows:

Sixty (60) grams of a 50% solution of fluoboric acid are mixed with 140 grams of 20% solution of potassium chloride. The mixing is accomplished by dripping or pouring both solutions slowly into 2960 grams of water carried in an appropriate container. The addition of the solutions of fluoboric acid and potassium chloride is accomplished in an even manner, with continuous stirring, during a three-hour period. Following completion of mixing, the solids are allowed to settle and the liquid is then decanted, removing some fine particles of solid precipitate which are still suspended or floating in the liquid. Then, as indicated above, this same procedure is repeated twice more in the same vessel while allowing all previously settled solids to remain each time, and after that, fourth and fifth reactions are accomplished using double the quantity (by weight) of fluoboric acid and potassium chloride. At this stage, it may be observed that crystals can be felt in the solids obtained although they are too small to be seen. Finally, three more mixing procedures or cycles are carried out, using four times the original reacting solutions. There are thus produced about 1000 grams of seed crystals, being the final total accumulation of settled solid material in the vessel.

The reaction involved in this as in the working operation of the new process, is as follows:

$$KCl + HBF_4 \rightarrow HCl + KBF_4$$

By way of preliminary to further description of the principal process of the invention, additional details of the resulting new product are given. As explained above, the potassium fluoborate heretofore available is a very fine, gritty, white powder, so fine that 90–100% of its particles will pass a standard 200 mesh screen. It has a strong tendency to cake or to cohere into a solid or hard mass when stored for any considerable period of time. This caking tendency renders the material difficult to handle or use, for example in removal from localities of storage or from shipping containers, or in attempting to cause flow of the material for various purposes, or in any use where it should be in loose particles. In contrast, the material of the present invention is an essentially free-flowing non-caking crystalline potassium fluoborate which obviates all of these difficulties. The particle size is such that a typical product, for example, contains only four to five percent of particles that will pass a 200 mesh standard screen, and indeed only about 15% (of the total) passing a 100 mesh standard screen, all the remainder being coarser than 100 mesh. The difference in appearance of the product is quite marked; instead of the dead white appearance of the conventional potassium fluoborate powder, the new material readily shows its crystalline structure, i. e. as a mass of discrete crystals, which do not cake during storage and which pour and flow easily.

For the basic step of the process, which involves mixing a water soluble potassium salt with fluoboric acid and a quantity of water containing some potassium fluoborate seed crystals, it appears that in general any water soluble salt of potassium can be used, e. g. potassium chloride, potassium sulfate, potassium nitrate, potassium acetate, potassium tartrate, and potassium phosphates. Of these, some are less satisfactory, for example in that the sulfate has limited solubility and salts such as the nitrate may give trouble in drying the produced fluoborate, i. e. in separating it from the other reaction product. The use of potassium chloride, however, is a preferred and indeed special feature of the invention; it is particularly suitable in all respects and is relatively inexpensive.

As an example of the process, a 20% (by weight) solution of potassium chloride in water is made up; for quantity production, so-called fertilizer grade muriate of potash can be used, in amount equivalent to pure KCl. The fluoboric acid, in this example, is used in a 23% solution (by weight), which can be made by diluting concentrated acid with water. While other concentrations of either or both of the reactant solutions can be used, the strengths of solution given above are particularly suitable in that equal volumes of them represent stoichiometric amounts of potassium chloride and fluoboric acid. Hence the two solutions can be fed at conveniently equal rates or supplied in equal quantities, to the reaction vessel, it being important to use the reactants in stoichiometric proportion, or nearly so, for best results. Of course if other relative concentrations are used, the feed of the solutions should be appropriately otherwise than in equal volumes, to provide the stoichiometric relation.

The mixing tank into which the reagent solutions are slowly introduced must contain a sufficient amount of seed crystals of potassium fluoborate which are of an appreciable size in accordance with the above description. For instance, 500 grams of such crystals may be used in a tank 6 of 25 liters capacity, which may be from half to three-fourths filled with water at the outset. Whether for batch or continuous operation, the two reactant solutions are then added to the tank slowly and at metered or regulated rates (as explained above), e. g. through the valves 16, while the liquid in the tank is stirred to keep the solids in suspension. From the beginning the tank contents are kept heated, preferably at a temperature of about 80°, for reasons already stated. The control of the mixing of the reactant solutions, i. e. by regulation of their rate of addition, is effected not only to maintain the desired chemical proportion but also to provide the desired production of crystals. It has been found that in operation of the type described, the rate of addition must be relatively slow in order to produce uniform precipitation and hence to enhance crystal growth rather than to provide deposition of the fluoborate only as fine particles. To the specific tank mentioned above, for example, the stated solutions can be added continuously at the rate of 25 liters per hour each, while the suspension (to yield product crystals) can be continuously removed from the bottom (pipe 18) at 50 liters per hour.

The agitation of the liquid is preferably sufficient to maintain all of the solids in a state of suspension in the liquid, both the original seed crystals and the additional crystalline growth which takes place during the reaction. Such agitation insures a substantially uniform size crystalline product. The agitation, however, need not be excessively vigorous. Indeed for continuous or semi-continuous operation the larger crystals should be allowed to collect at or near the bottom of the tank 6; hence as they are drawn off to constitute the product, the smaller and newer crystals forming and growing in upper parts of the vessel provide seed for further fluoborate deposition and in turn, indeed continuously, provide further accumulation of product crystals near the bottom.

As just indicated, the second operation or step of the process is tapping off the potassium fluoborate crystals which are formed. A convenient procedure, especially for continuous or semi-continuous operation, is to withdraw some of the suspension from the bottom of the tank 6 (e. g. through the pipe 18), thus removing a corresponding quantity of the larger (i. e. completed) crystals which tend to accumulate there. A considerable amount of crystals remain, suspended in the liquid as explained above, and continue as seed for further or continuing precipitation of potassium fluoborate. Of course, if the operation is wholly of a batch type, the entire mass of solids can be removed from the reaction vessel at the end of the period of progressive addition and reaction (of the chemicals), but some of the crystals from such batch or from some previous batch should be saved to provide seed for subsequent repetition of the process. An example of the presently preferred continuous type of operation has been given hereinabove, i. e. relative to the approximate rates of continuous solution inlet through the pipes 12, 14, and continuous suspension discharge through the pipe 18.

Subsidiary further steps in the complete process may involve washing and drying the product, i. e. chiefly to remove all of the chloride (or specifically, hydrogen chloride) which is contained in the portion of solution removed with the crystals. Preferably this liquid carrying the crystalline precipitate is cooled, e. g. to room temperature or below, upon withdrawal from the reaction tank, and such cooling may advantageously be continued throughout the washing process. The crystals are thus washed with water, in any manner appropriate for batch or continuous operation, until they are essentially free of chloride. In practice, this step is preferably carried to the point where the wash water no longer gives or would give a positive test for the chloride ion.

The product can then be dried, in any suitable manner. By way of example, a particularly effective drying operation involves two stages, as follows: First of all, the wet washed crystals are dried in a centrifuge, which will separate all but about 3% of the accompanying water. The final 3% of moisture should be removed by further drying, which can be accomplished in any appropriate way such as by application of heat while effecting some agitation of the crystals. For instance, an ordinary rotary drier can be used for this last step of separating moisture, to yield a dry, free-flowing, granular product.

As has been intimated above, the process may be carried out either as a batch method or as a continuous (or semi-continuous) operation. It will be clear that the steps involved are essentially the same in either case, although it is at present preferred to use a continuous process, for which a system of apparatus of the sort schematically illustrated in the drawing lends itself very effectively. By having the reaction tank of liquid, which contains some seed crystals, in continuous agitation, the two ingredients may be introduced continuously at controlled rates while the product is tapped off (at a similarly controlled, continuous rate) from the bottom of the tank. It will be appreciated that, as the crystalline growth progresses during the action in the tank, the heavier (i. e. larger) crystals will tend to settle to or accumulate near the bottom and will be preferentially drawn off and through the outlet, in the liquid there tapped. Such crystals are then washed and dried in a suitable batchwise or continuous manner, for instance by continuous performance of the washing and drying steps outlined above.

One example of a typical product of the invention, e. g. obtained by using the specific procedure and specific concentrations and proportions of reagents given hereinabove, is a substantially pure potassium fluoborate ($KBF_4$) in the form of a white, non-caking, free-flowing crystalline material having its particle sizes ranging from plus 40 mesh standard screen size to a fine powder. More particularly, representative samples of the material so produced were found to have particle size characteristics (illustratively typical of the presently preferred product) as set forth in the following table of percentages (by weight) of such product that are successively retained on various standard screen mesh sizes:

| Screen | Retained fraction, per cent |
|---|---|
| +20 | 0 |
| −20+40 | 1 |
| −40+60 | 45 |
| −60+80 | 24 |
| −80+100 | 15 |
| −100+200 | 10.5 |
| Pan | 4.5 |

It will be observed that most of the product is coarser than 200 mesh, and indeed more than about 80% of it is coarser than 100 mesh. Thus in the example above, to illustrate the relative uniformity of particle size, there was 84% of the product that would pass 40 mesh but would be held on 100 mesh. As explained, this somewhat coarse character of the material contributes very significantly to its advantages. Indeed on present understanding, and within appropriate limits, the larger the crystals the better the product; the process is preferably controlled with that end in view, to the extent consistent with efficiency and economy of production.

It is to be understood that the invention is not limited to the specific examples herein described but may be carried out in other ways without departure from its spirit.

We claim:

1. The process for producing crystalline potassium fluoborate comprising reacting in solution a water-soluble potassium salt with fluoboric acid in the presence of seed crystals of potassium fluoborate while maintaining the mixture in agitation and at a temperature of at least about 65° C.

2. The process for producing crystalline potassium fluoborate comprising reacting by mixing substantially stoichiometric amounts of a water-soluble potassium salt with fluoboric acid in aqueous liquid containing seed crystals of potassium fluoborate while maintaining the liquid in agitation and at a temperature of at least about 65° C.

3. A process for producing crystalline potassium fluoborate comprising supplying solutions of fluoboric acid and of a water-soluble potassium salt to a body of aqueous liquid containing seed crystals of potassium fluoborate, for reaction between said acid and potassium salt to deposit crystalline potassium fluoborate, while maintaining the liquid in agitation to keep the contained crystalline solids in suspension and while maintaining the liquid at a temperature of at least about 65° C.

4. The process of producing crystalline potassium fluoborate comprising reacting in solution a water-soluble potassium salt with fluoboric acid in the presence of seed crystals of potassium fluoborate, to deposit crystalline potassium fluoborate, while maintaining the mixture in agitation and at a temperature of at least about 65° C., thereafter separating crystalline potassium fluoborate from said mixture, and washing and drying the said separated fluoborate, to yield a product consisting of potassium fluoborate crystals.

5. The process for producing crystalline potassium fluoborate comprising simultaneously supplying successive quantities of solutions of fluoboric acid and a water-soluble potassium salt to a body of aqueous liquid containing seed crystals of potassium fluoborate, for reaction between said acid and potassium salt to deposit crystalline potassium fluoborate, while maintaining the liquid in agitation to keep the contained crystalline solids in suspension and while maintaining the liquid at a temperature of at least about 65° C., withdrawing successive quantities of liquid and suspended crystals therein from a lower part of said body, said withdrawn crystals constituting a larger-sized fraction of those produced by reaction, and separating the said withdrawn crystals from the liquid and drying said crystals.

6. The process for producing crystalline potassium fluoborate comprising reacting by mixing at predetermined rates stoichiometric amounts of potassium chloride in solution and fluoboric acid in solution in the presence of seed crystals of potassium fluoborate and at a temperature of at least about 65° C., agitating the solution during the mixing, removing larger crystals as formed while at least some crystals to act as seed, washing the removed crystals to free them of chloride, and drying the washed crystals.

7. The process for producing crystalline potassium fluoborate comprising simultaneously continuously supplying solutions of fluoboric acid and potassium chloride, in substantially stoichiometric proportion of said acid and chloride, to a body of aqueous liquid containing seed crystals of potassium fluoborate, for reaction between said acid and potassium chloride to deposit crystalline potassium fluoborate, while maintaining the liquid in agitation to keep the contained crystalline solids in suspension and while maintaining the liquid at a temperature of at least about 65° C., continuously withdrawing liquid and suspended crystals therein from a lower part of said body, said withdrawn crystals constituting a larger-sized fraction of those produced by reaction, separating the last-mentioned crystals from the liquid, washing the crystals to free them of chloride, and drying said crystals.

8. The process of producing crystalline potassium fluoborate comprising mixing at predetermined slow rates into a quantity of aqueous liquid containing seed crystals of potassium fluoborate, solutions of potassium chloride and of fluoboric acid so that stoichiometric amounts of potassium chloride and fluoboric acid are presented, while maintaining the mixture at a temperature of at least about eighty degrees centigrade and while agitating the mixture, removing most of the crystals after their formation, and washing and drying the removed crystals.

References Cited in the file of this patent

FOREIGN PATENTS 122,509   Switzerland _____ Sept. 16, 1927

OTHER REFERENCES

Hackh's Chem. Dict., page 677 (left hand col.), third ed. rev., 1944.

J. W. Mellor's "A Comprehensive Treatise on Inorganic and Theoretical Chem.," vol. 5, 1924 ed., page 126. Longmans, Green and Co., N. Y.